June 13, 1933.  W. E. KING  1,913,636
UNIFORM PRESSURE CASING CUTTER
Filed March 30, 1928   2 Sheets-Sheet 1

Walter E. King INVENTOR.
BY Jesse R. Stone
ATTORNEYS.

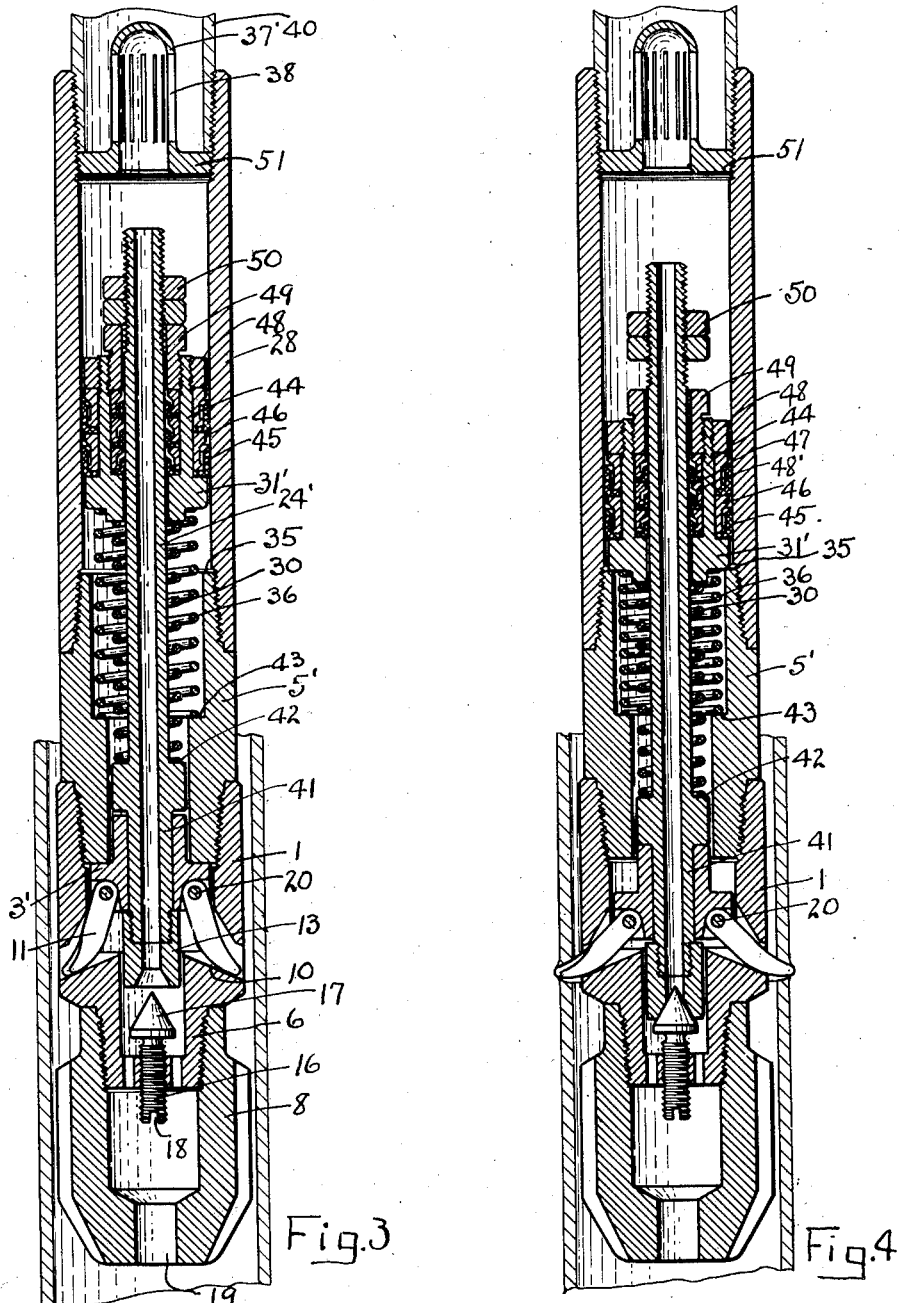

Patented June 13, 1933

1,913,636

UNITED STATES PATENT OFFICE

WALTER E. KING, OF HOUSTON, TEXAS, ASSIGNOR TO JAMES S. ABERCROMBIE, OF HOUSTON, TEXAS

UNIFORM PRESSURE CASING CUTTER

Application filed March 30, 1928. Serial No. 266,081.

My invention relates to cutting devices for use in deep wells in cutting casing or other similar pipe from the well, and pertains more particularly to inside casing cutters designed to be introduced inside of the pipe to be cut and rotated to sever the pipe at the desired point.

In cutters of this kind now in common use where the force of the flushing fluid is employed to advance the cutters during the cutting operation, difficulty is experienced due to the fluctuations of pressure in the flushing fluid. The pumps employed in forcing the liquid into the drill stem are usually large and heavy pumps of the reciprocating type which send the fluid in pulsations through the stem. Furthermore, it is difficult to secure an even operation in these pumps to secure uniform pulsations. The result is that the cutters are advanced into contact with the pipe in such manner as to exert a shock upon the cutters due to the uneven pressure exerted upon the device, and the cutters, therefore, operate unevenly and are liable to breakage. This difficulty is hard to overcome and is one which causes an excess breakage of cutters and a generally unsatisfactory operation of the device.

A further objection to the tools of this type is that the pumps employed very often develop an excess of pressure. This condition tends to press the cutters into the pipe that is being cut, with such force that the strain causes them to break. All tools in the prior art have had rigid connections between the piston and cutter holders, and any movement of the piston would cause a movement of the cutters.

It is an object of my invention to provide means in the operation of a cutter of this kind where the cutters are advanced indirectly through the pressure of the fluid, said device being so constructed as to exert a steady and uniform pressure upon the operating mandrel so that the cutters may be operated under a uniform and steady pressure, thus avoiding the customary difficulties with this type of device.

It is my aim to employ a spring between the piston and the cutting head which will be placed under tension by the water pressure and the cutters advanced entirely through the pressure of the spring. Any excess pressure created by the pumps will not be transmitted to the cutters in my tool because I provide a stop for the piston, and, therefore, any amount of pressure above that required to force the piston to the stop is ineffective, and, as stated above, leaves the spring the sole agency for feeding the cutters.

Referring to the drawings herewith, wherein two separate embodiments of the invention are disclosed, Fig. 1 is a central longitudinal section through a cutting device embodying my invention, said device being shown as extended within a pipe to be cut.

Fig. 3 is a similar view to that shown in Fig. 1, but illustrating a different embodiment of the invention.

Fig. 4 is a similar view to that shown in Fig. 3 but with the cutters in advanced position.

Figure 1:
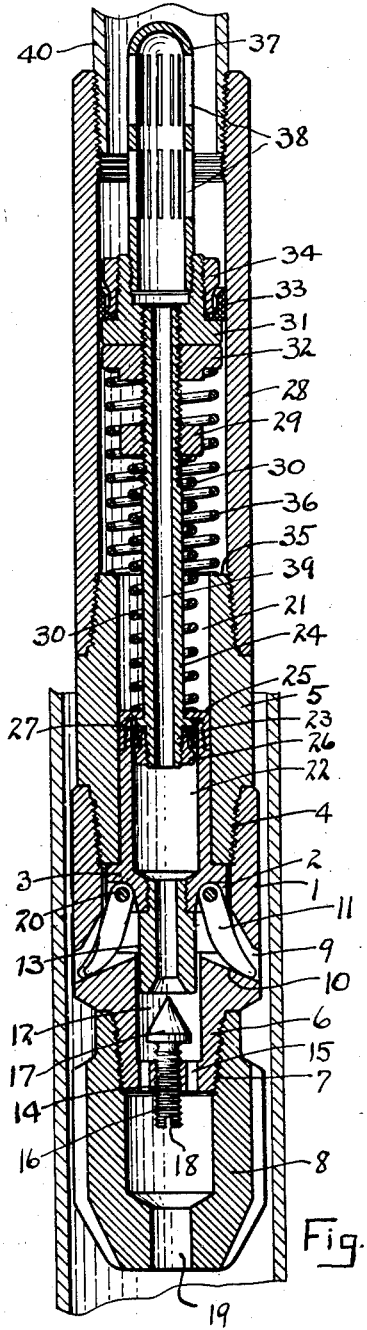

The pipe cutter which is disclosed in my invention is similar in general construction to others now on the market, but has attached thereto my novel means of operating said cutters. The cutter employs a head 1 which has a central recess or chamber 2 therein for the operation of the holder 3 for the cutters. The head 1 is provided with a threaded socket 4 at its upper end to receive a nipple 5. At its lower end it is provided with a threaded shank 6 adapted to be engaged within the upper end 7 of a milling tool or guide shoe 8.

The head 1 is provided with a plurality of openings 9 which are inclined downwardly and the lower walls 10 of said openings form a deflecting cam surface upon which the cutters 11 may ride. The chamber 2 within the head 1 is decreased in diameter below the shoulders 10 and forms a guide passage 12 for a lower projection 13 upon the holder. At the lower end of the passage 12 is a transverse wall 14 which is perforated at 15 to allow the passage of fluid. Centrally of this wall is secured a threaded valve stem 16 which projects upwardly into the passage 12 and has thereon a stationary valve head 17 tapering upwardly. The lower end of said valve stem is slotted at 18 to receive a screw driver or similar tool whereby the valve 17 may be adjusted vertically in an obvious manner. The lower end of the milling tool 8 is provided with a central passage 19 through which a tool may be inserted for adjusting said valve.

The cutter holder 3 has its lower end shaped to fit within the chamber 2 and the passage 12, as has been mentioned, and is adapted to have a limited vertical sliding movement therein. The cutters 11 are pivoted to the lower end of the head at 20, and it will be obvious from the drawings that when the head is moved downwardly the cutters sliding on the shoulder 10 will be deflected out against the casing. This type of cutter is not believed to be new in the art.

The upper end of the holder 3 is cylindrical and fits within the central passage 21 through the nipple 5. It is hollow and has a cylinder 22 therein to receive a head 23 upon a mandrel 24 slidable therein. The upper end of the cylinder 22 is closed about the mandrel by a cap 25 screwed upon the upper end of said cylinder.

The mandrel 24 is tubular and the head 23 comprises a radial flange between which and a nut 26 is clamped a packing cup 27 which makes a sliding fluid tight fit with the cylinder. Said mandrel extends upwardly above the nipple within a barrel 28 and has screwed upon its upper end a bearing nut 29 for a coiled spring 30; and a piston head 31, the nut being spaced downward from the piston head. Below the head is a lock nut and bearing member 32.

The head has a packing ring 33 held in position by a nut 34. The interior of the barrel 28 forms a cylinder in which the piston head fits slidably. Between the nut 32 and the shoulder 35 formed at the upper end of the nipple 5 is a spring 36 which tends to hold the mandrel and piston in raised position.

I may employ a strainer for the fluid passing through the device and I have shown a bull plug 37 screwed into the upper end of the piston, said plug having straining slots 38 formed therein to allow the fluid to pass into the passage 39 through the mandrel.

In use, the device is connected to a pipe or drill stem 40 and lowered into the casing to the point where the cut is to be made. Water is pumped downwardly through the device while it is being lowered to clear the well ahead. If obstructions are encountered, the milling tool 8 may be rotated to clear the passage. When the proper lever has been reached, the drill stem will be firmly supported at the surface for rotation. The pump pressure will be then increased to exert sufficient force to move the piston and mandrel downwardly against the pressure of the spring 36.

Figure 2:
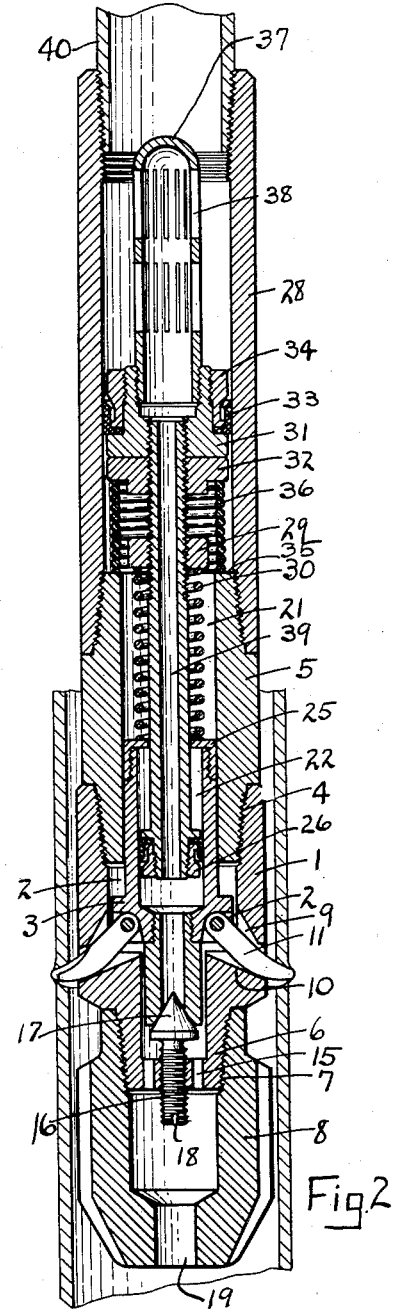
Fig. 2 is a similar view showing the cutters in advanced position with the pipe severed.

This downward movement will move the head 23 downwardly in the cylinder 22 and the spring 36 will be compressed to the position shown in Fig. 2. This is the downward limit of movement of the mandrel. The downward movement of the mandrel will compress the spring 30 so as to exert a pressure upon the holder 3 and move it downwardly to force the cutters 11 against the casing. The tool will then be rotated and the cutters will mill a channel in the casing which will eventually cut through the casing wall and sever the upper section.

As the cutting is in progress the fluid pressure will be maintained but inequalities therein will not be noticeable upon the cutters as the said cutters are advanced solely by the spring 30, and this pressure will be a constant one. When the holder has been moved down far enough to advance the cutters entirely through the casing, as shown in Fig. 2, the lower end of the guide member 13 will seat upon the valve 17, sealing the passage of fluid through the device. This will slow up or stop the pumps to indicate to the operator that the cut has been finished. It will be noted that the valve may be set at the desired height to shut off the circulation at the point where the casing will be severed and this point may be varied to suit the particular casing being cut. The pump pressure may be next released and the spring 36 will raise the mandrel to withdraw the cutters.

In the smaller sizes of casing cutters, there may be insufficient space to allow for a cylinder 22 in the holder and I may, therefore, alter the construction somewhat to meet these conditions and still get the same result. In Figs. 3 and 4 an embodiment of the invention is shown which is adaptable for the smaller sizes.

In this embodiment the mandrel 24' has a head 41 that extends through the holder and is screwed within the guide 13. It has a shoulder 42 above the holder to form a seat for the spring 30, and a shoulder 43 is formed in the inner wall of the nipple 5' to receive the lower end of the spring 36.

The piston at the upper end of the mandrel is adapted to slide in the barrel 28 and also upon the mandrel 24'. It has a head 31' upon which is a supporting wall 44 threaded both externally and internally. The outer surface furnishes a seat for packing cups 45 and spacing rings 46; and the inner face receives packing rings 47 and spacers 48' making a fluid tight fit with the mandrel. A ring nut 48 holds the outer rings in place and an interior nut 49 serves to lock the interior rings in position. Above the piston are stop nuts 50 limiting the upward travel of the piston on the mandrel and adapted to be adjusted thereon in an obvious manner.

In this embodiment, the strainer 37' is formed upon a disc 51 adapted to screw into the upper end of the barrel and is therefore stationary.

In the operation of this embodiment, the pressure of the flushing fluid exerted upon the piston 31' will force it downward into contact with the shoulder 35 at the upper end of the nipple 5', thus compressing the spring 36, and also the spring 30. The spring 30 will exert a uniform pressure upon the holder to advance the cutters, as previously explained. When the cut has been made, the release of the pump pressure will cause both springs to expand to return the piston to its upper position, moving up the mandrel and withdrawing the cutters.

The advantages of this type of cutter advancing means is that the cutters will be acted upon by a steady and constant pressure during the cutting operation and no change in the level of the cutters will occur during the cutting of the casing. This will assure a smooth and even pressure upon these cutters so that they will not be damaged and will tend to avoid breaking of the cutters in use. Greater accuracy and better quality of work is assured.

Having thus described the invention, what I claim is:

1. A pipe cutter including a head, a holder slidable in said head, cutters on said holder adapted to be advanced by the downward movement thereof, a mandrel, a piston slidable thereon, means to hold said piston and mandrel resiliently upward, and a spring adapted to be compressed by the downward movement of said piston, to exert a steady pressure upon said holder to advance said cutters.

2. A pipe cutter including a head, a holder slidable in said head, cutters on said holder adapted to be advanced by the downward movement thereof, a mandrel, a piston slidable thereon, a spring to hold said piston and mandrel resiliently upward, and a spring adapted to be compressed by the downward movement of said piston with respect to said mandrel, said holder being responsive to the pressure of said last spring to advance said cutters.

3. In a device of the character described, a head, a holder movable therein, cutters on said holder adapted to be moved radially by the vertical movement of said holder, a mandrel, a piston on said mandrel slidable with respect thereto, a spring on said mandrel bearing on said holder and adapted when compressed to move said holder with a steady pressure, said piston being adapted to be actuated by fluid pressure to move said mandrel downwardly and compress said spring.

In testimony whereof I hereunto affix my signature this 27th day of February, A. D. 1928.

WALTER E. KING.